(12) United States Patent
Vadipour (10) Patent No.: US 12,264,085 B1
(45) Date of Patent: Apr. 1, 2025

(54) DEVICE AND SYSTEM FOR WATER DESALINIZATION

(71) Applicant: Morteza Vadipour, Woodland Hills, CA (US)

(72) Inventor: Morteza Vadipour, Woodland Hills, CA (US)

( * ) Notice: Subject to any disclaimer, the term of this patent is extended or adjusted under 35 U.S.C. 154(b) by 0 days.

(21) Appl. No.: 18/678,363

(22) Filed: May 30, 2024

(51) Int. Cl.
  *C02F 1/14* (2023.01)
  *C02F 1/26* (2023.01)
  *C02F 103/08* (2006.01)

(52) U.S. Cl.
  CPC .............. *C02F 1/14* (2013.01); *C02F 1/265* (2013.01); *C02F 2103/08* (2013.01)

(58) Field of Classification Search
  CPC .......... C02F 1/14; C02F 1/265; C02F 2103/08
  See application file for complete search history.

(56) References Cited

U.S. PATENT DOCUMENTS

| | | |
|---|---|---|
| 3,351,538 A | 11/1967 | Andrassy |
| 6,663,750 B1 | 12/2003 | Coon |
| 6,797,124 B2 | 9/2004 | Ludwig |
| 10,926,188 B2 | 2/2021 | Martin |
| 11,156,384 B2 | 10/2021 | Qu |
| 2011/0108406 A1 | 5/2011 | Maisotsenko |
| 2012/0085635 A1 | 4/2012 | Haynes |
| 2012/0228114 A1 | 9/2012 | Joseph, III |
| 2012/0267230 A1 | 10/2012 | Kerschgens |
| 2016/0136537 A1 | 5/2016 | Mcgee |
| 2017/0334738 A1 | 11/2017 | Suh |
| 2020/0339440 A1 | 10/2020 | Riley |
| 2022/0289595 A1 | 9/2022 | Beaudin |

FOREIGN PATENT DOCUMENTS

| | | | |
|---|---|---|---|
| CN | 101503227 A | | 8/2009 |
| CN | 111874976 A | | 11/2020 |
| CN | 213012048 U | * | 4/2021 |
| CN | 113718898 B | | 6/2022 |
| EP | 0612691 A1 | * | 8/1994 |

(Continued)

OTHER PUBLICATIONS

Full English Translation of Zheng et al Patent Publication CN111874976A, published Nov. 2020. (Year: 2020).

(Continued)

*Primary Examiner* — Waqaas Ali
(74) *Attorney, Agent, or Firm* — DANE IP Law PC (57) ABSTRACT

A water desalinization apparatus for efficient water desalinization includes a first removable cover for daytime use and a second removable cover for nighttime use. The first removable cover allows sunlight and infrared rays to pass through the cover to heat saline water held in a fluid basin. The second removable cover is positioned on the fluid basin when the first removable cover is removed from the fluid basin to form the water vapor from the saline water. The second removable cover includes a first plate that acts as a cold body to convert the water vapor to fresh liquid water. A second plate is arranged between a freshwater collection conduit and the fluid basin. The second plate may have nonlinear apertures or two sub plates with misaligned apertures configured to pass the water vapor from the fluid basin to the first plate.

24 Claims, 7 Drawing Sheets

(56) References Cited

FOREIGN PATENT DOCUMENTS

| EP | 2808068 A1 | * | 12/2014 | ........... B01D 1/0035 |
|----|---|---|---|---|
| EP | 3792579 A1 | | 3/2021 | |
| KR | 20130103155 A | | 9/2013 | |
| KR | 101500627 B1 | | 3/2015 | |
| KR | 20170023235 A | | 3/2017 | |
| KR | 20190085400 A | | 7/2019 | |
| RU | 2655892 C1 | | 5/2018 | |
| WO | WO-2008040489 A1 | * | 4/2008 | ........... B01D 1/0035 |
| WO | 2012127081 | | 9/2012 | |
| WO | WO-2021048007 A1 | * | 3/2021 | ............. B01D 1/221 |

OTHER PUBLICATIONS

Full English Translation of Ma et al Patent Publication CN213012048U, published Apr. 2021. (Year: 2021).

* cited by examiner

DEVICE AND SYSTEM FOR WATER DESALINIZATION

CROSS-REFERENCE TO RELATED APPLICATIONS

Not applicable.

FIELD

The present disclosure relates to desalinization and, more particularly, to a device and system for water desalinization.

BACKGROUND

Generally, a condensation system for efficient sea water desalinization employs two steps for desalinization of water through condensation. First, water is warmed/heated. Second, the resultant water vapor is brought into contact with a relatively cold surface to condense and collect the water vapor droplets as fresh water. The larger the difference between heating and cooling temperatures the more efficient the desalinization process will be.

SUMMARY

This application is related to U.S. Prov. Pat. App. Ser. No. 63/375,839, filed on 2022 Sep. 15, U.S. Prov. Pat. App. Ser. No. 63/374,385, filed on 2022 Sep. 2, US Nonprov. Pat. App. Ser. No. 18362975, filed on 2023 Aug. 1, and PCT/US23/71554, filed on 2023 Aug. 2, the entire contents of which are expressly incorporated herein by reference.

In a device and system for water desalinization according to aspects of the present disclosure, saline water of an ocean, sea, river, or other similar body of water is pumped thorough a series of pipes and into a desalinization plant including at least one desalinization apparatus. As an example, the desalinization plant may be in a desert. A water desalinization apparatus employed by the water desalinization plant includes a relatively shallow pool to achieve high water temperatures during the day for heating the water to form water vapor. A transparent daytime cover is used during the day to maximize heat retention in the relatively shallow pool by allowing sunlight, including infrared rays, to pass therethrough. The bottom and surrounding walls of the pool are well insulated to reduce heat exchange with the ground or surrounding. The daytime cover can be replaced with a nighttime cover including a cold body that is used to condense water vapor and collect fresh water that is vaporized from the saline water.

Provided in accordance with aspects of the present disclosure is a fluid desalinization apparatus including a fluid basin configured to receive saline water. The fluid basin receives heat energy to form water vapor from the saline water. A first removable cover is employed to cover the fluid basin to maximize heat retention in the fluid basin. The first removable cover allows sunlight and infrared rays to pass through the cover to heat the saline water. A second removable cover is configured to be positioned on the fluid basin when the first removable cover is removed from the fluid basin to form the water vapor from the saline water. The second removable cover includes a first plate arranged above the fluid basin. The first plate acts as a cold body to convert the water vapor to fresh liquid water. A freshwater collection conduit is arranged below the first plate. The freshwater collection conduit collects the fresh liquid water from the first plate and directs the fresh liquid water to a storage tank. A second plate is arranged between the freshwater collection conduit and the fluid basin. The second plate includes nonlinear apertures configured to pass the water vapor from the fluid basin to the first plate. The nonlinear apertures define a shape lacking a direct line of sight through the nonlinear apertures.

Provided in accordance with aspects of the present disclosure is a fluid desalinization apparatus including a fluid basin configured to receive saline water. The fluid basin receives heat energy to form water vapor from the saline water. A first plate is arranged above the fluid basin. The first plate acts as a cold body to convert the water vapor to fresh liquid water. A freshwater collection conduit is arranged below the first plate. The freshwater collection conduit collects the fresh liquid water from the first plate and directs the fresh liquid water to a storage tank. A second plate is arranged between the freshwater collection conduit and the fluid basin. The second plate includes nonlinear apertures configured to pass the water vapor from the fluid basin to the first plate. The nonlinear apertures define a shape lacking a direct line of sight through the apertures.

In an aspect of the present disclosure, the first plate includes projections configured to condense the water vapor to form the fresh liquid water. The projections define a tapered tip to drop the fresh liquid water below the first plate toward the freshwater collection conduit.

In an aspect of the present disclosure, the projections define a blade shape, a conical shape, or a pyramidal shape.

In an aspect of the present disclosure, the freshwater collection conduit includes at least one channel arranged below the projections. The channel is vertically aligned with a tip of a corresponding projection and is configured to receive water dripped from the tip of the corresponding projection.

In an aspect of the present disclosure, at least one projection is configured to be vibrated or mechanically agitated to remove water from the projection. In another embodiment, an impactor, such as a pendulum, could periodically hit the structure supporting the projections facilitating release of droplets into the freshwater collection conduit. The impactor could be mechanically powered by a small windmill that does not require electricity.

In an aspect of the present disclosure, the projections include at least one hydrophilic material.

In an aspect of the present disclosure, the water collection conduit includes at least one hydrophobic material vertically aligned with the hydrophilic material of the projection.

In an aspect of the present disclosure, the freshwater collection conduit includes at least two channels arranged below the projections. The channels define a space between the channels to allow the water vapor to pass through the space.

In an aspect of the present disclosure, a sidewall forms an airtight seal between the first plate and the second plate.

In an aspect of the present disclosure, the fluid basin defines a sidewall and a floor including a dark sunlight absorbing material for heating the saline water.

In an aspect of the present disclosure, the fluid desalinization apparatus may also include a transparent cover to allow sunlight and infrared rays to heat the saline water. The first plate and the second plate are removable from the fluid basin, and the transparent cover is configured to removably cover the fluid basin when the first plate and the second plate are removed from the fluid basin.

In an aspect of the present disclosure, the first plate and the second plate are parts of a single integrally formed structure. The single integrally formed structure is removable from the fluid basin.

In an aspect of the present disclosure, fins are defined on the first plate. The fins are configured to cool the first plate.

In an aspect of the present disclosure, a freshwater collection tank is in fluid communication with the freshwater collection conduit.

In an aspect of the present disclosure, the nonlinear apertures define a curved cylindrical shape or a curved slit shape.

In an aspect of the present disclosure, the projections define a tapered tip configured to drop the fresh liquid water below the first plate toward the freshwater collection conduit.

BRIEF DESCRIPTION OF THE DRAWINGS

Various aspects and features of the present disclosure are described hereinbelow with reference to the drawings wherein.

DETAILED DESCRIPTION

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

One important factor for an optimum condensation operation, such as water desalinization, is to prevent any kind of water heat loss, either by convection or radiation, except through water vapor. Many water desalinization systems operate inefficiently or do not operate at all due to not observing this important rule. While some conventional desalinization systems provide reasonably good insulation against heat convection loss, quite often they do not provide proper prevention of water heat radiation.

Radiation loss of heated water has the double penalty in that it lowers the useful temperature of the water, and at the same time, because the radiation is absorbed by the condensing plate, increases that plate's temperature lowering its condensing efficiency.

Referring generally to FIGS. 1-5, in system 100 for water desalinization, saline water of an ocean or a sea is pumped thorough long pipes 121 into a desalinization plant 101 (e.g., in a desert). Pools, such as fluid basins 102 (see, e.g., FIG. 2), are filled with this water where appropriate daytime and nighttime covers are utilized for the condensation process. The pipes 121 may be positioned above ground and may heat saline water traveling therethrough. As an example, the pipes 121 may have a dark (e.g., black) exterior or a dark (e.g., black) coating to gradually increase the temperature of saline water passing therethrough. Alternatively, pipes 121 may pass through tunnels (e.g., underground tunnels) to reach the desalinization plant 101.

Figure 1:
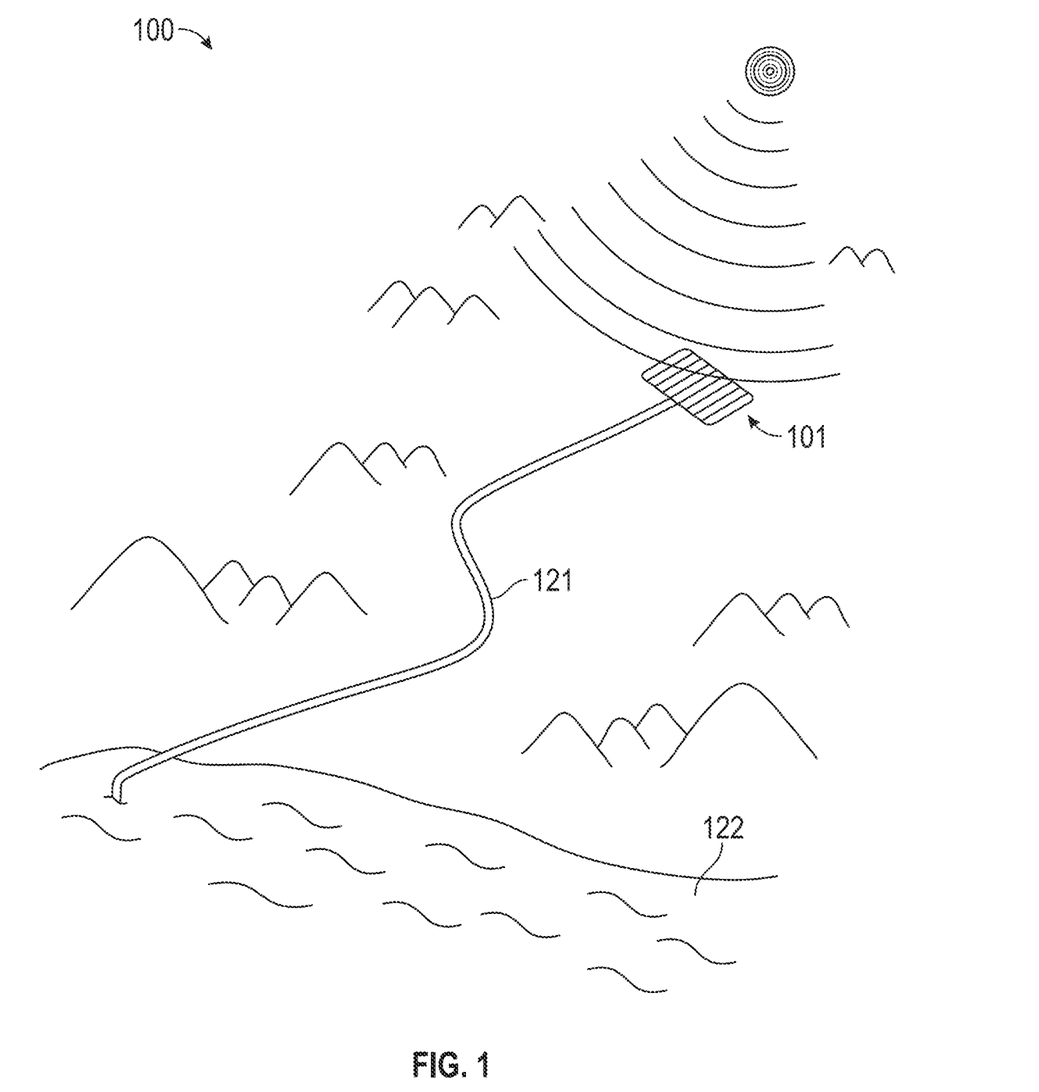
FIG. 1 illustrates a system for water desalinization including an apparatus for water desalinization according to aspects of the present disclosure.
Figure 2A:
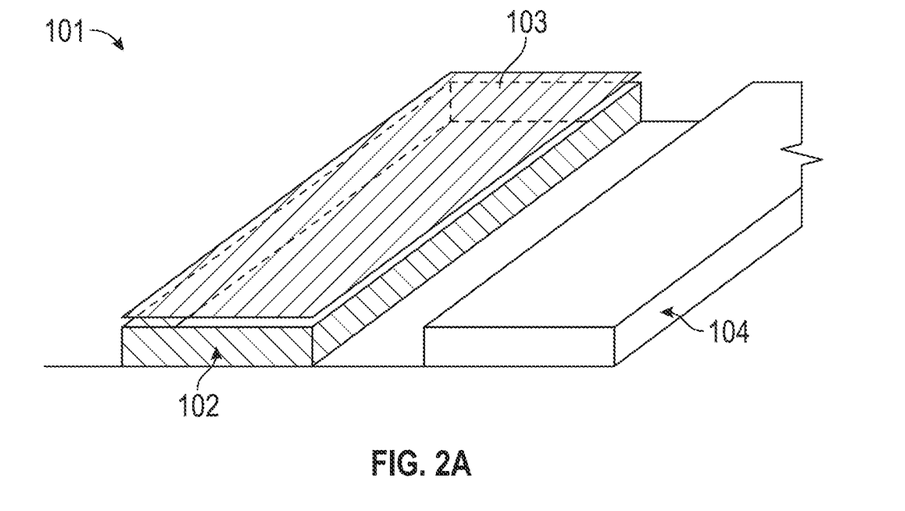
FIG. 2A is a perspective view of the fluid desalinization apparatus of FIG. 1 with a first cover configured for daytime use on a pool or fluid basin.
Figure 2B:
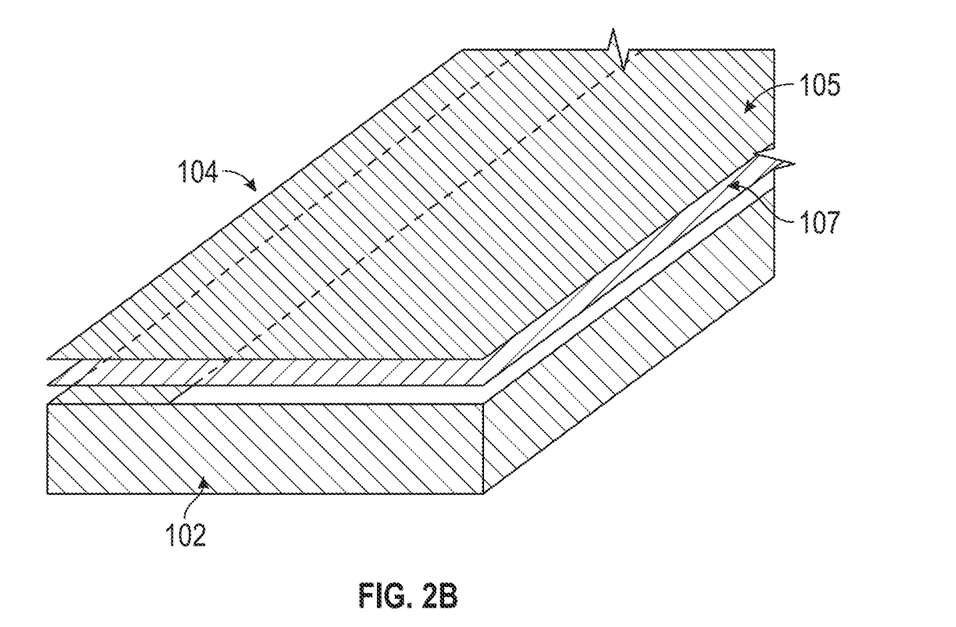
FIG. 2B is a perspective view of the fluid desalinization apparatus of FIG. 1 with the daytime cover replaced with a second cover configured for nighttime use on the pool or fluid basin.
Figure 3A:
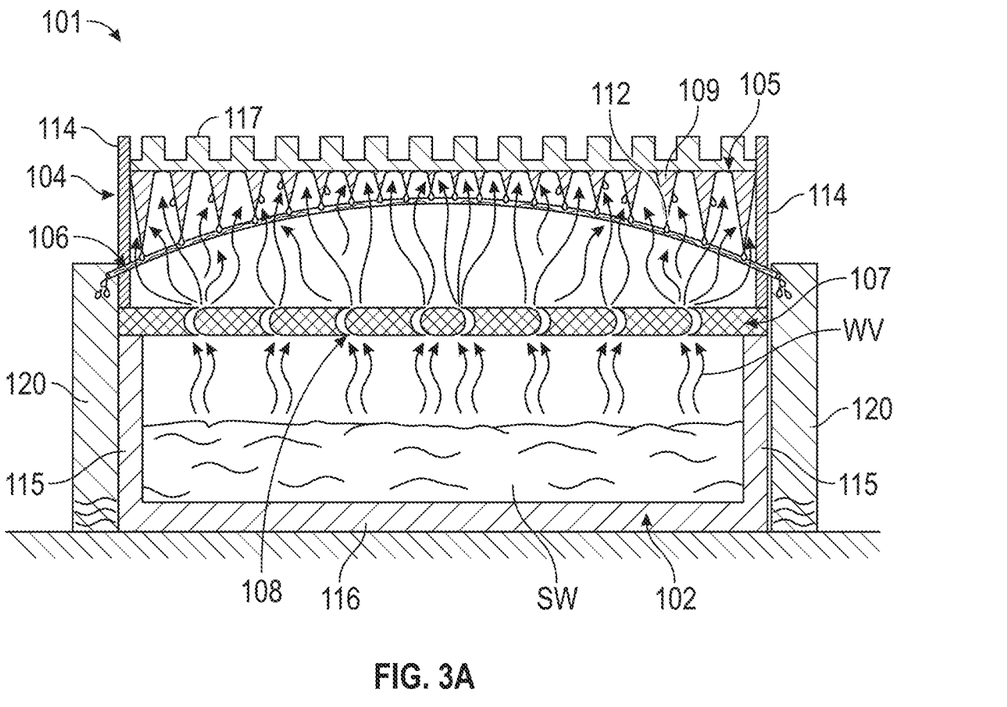
FIG. 3A is a cross-sectional view of the fluid desalinization apparatus of FIG. 1 with the second cover on the pool or fluid basin.

Referring particularly to FIGS. 1 and 3A, in the system 100 for water desalinization according to aspects of the present disclosure, saline water of an ocean, sea, river, or other similar body of water 122 is pumped through a series of pipes 121 and into a desalinization plant including at least one desalinization apparatus 101. As an example, the desalinization plant may be in a desert. The desert is a land area where diurnal air temperature difference is at least 20 degrees Fahrenheit. Diurnal air temperature difference is a difference in air temperature at night compared to the air temperature during the daytime. However, it is also contemplated that desert may be a land area where the diurnal air temperature difference is at least 30-, 40-, 50- or 60-degrees Fahrenheit for at least 3 to 12 months of the year. The water desalinization apparatus 101 employed by the water desalinization plant includes a relatively shallow pool (e.g., fluid basin 102) to achieve high water temperatures during the day for heating the water to form water vapor (e.g., during the nighttime). The fluid basin may include a sidewall(s) 115 and a floor 116. The sidewall(s) 115 and/or the floor 116 may include a dark sunlight absorbing material (e.g., a black or gray coating) to increase the temperature in the fluid basin 102.

The fluid basin 102 may have a relatively shallow depth (e.g., from about 1 inch to about 18 inches) to maximize water temperatures during the day. The walls and/or or floors of the fluid basin 102 may include one or more relatively dark sunlight absorbing materials on the surface to warm up the water, and heat insulating materials facing the surroundings and ground to prevent heat losses. Although the depth has been described as being between 1 inch to about 18 inches, it is also contemplated that the depth may be greater than 18 inches including but not limited to 4 to 30 feet in depth.

In use, and generally referring again to FIGS. 1-5, a transparent daytime cover (see, e.g., cover/plate 103) is used during the day to maximize heat retention in the relatively shallow pool (see, e.g., fluid basin 102) by allowing sunlight, including infrared rays, to pass therethrough. The daytime cover can be replaced with a nighttime cover (see, e.g., cover/plate 104) including a cold body that is used to condense water vapor and collect fresh water that is vaporized from the saline water.

During the daytime the transparent cover can be used to let sunlight, including infrared rays, pass through the cover. This cover can be tightly held over the pool to prevent water evaporation during the day.

During the nighttime, the daytime cover is replaced with the nighttime cover. The nighttime cover may include at least two layers or plates (see, e.g., first or upper plate 105 and second or lower plate 107). The upper plate acts as a cold body to cause condensation (e.g., on the bottom surface of the upper plate). As an example, the upper plate may be stored underground or in a cool area. To reduce the temperature of the upper plate, the upper plate may be positioned in a pool of cold water. The upper plate may be fabricated from a material which has a high coefficient of heat transfer. More particularly, the upper plate may be fabricated from materials with a coefficient of heat transfer equal to or higher than aluminum. The upper plate is cooled down during the nighttime by radiating its heat into the open sky (the open sky has a relatively low background temperature) or by nighttime breeze passing across the upper plate (e.g., through upper fins of the upper plate). The bottom layer of the nighttime cover is a heat-insulating slab tightly sitting over the pool preventing any heat loss of the warm water during the night through conduction or radiation. The first plate 105 and the second plate 107 may be parts of a single integrally formed structure (i.e., the second removable cover 104 may be a single integrally formed structure). The single integrally formed structure is removable from the fluid basin 102. A sidewall 114 forms an airtight seal between the first plate 105 and the second plate 107. The sidewall 114 may be formed of or may include a heat insulating material for preventing heat loss though conduction or radiation.

Referring particularly to FIGS. 2A-3B, a fluid desalinization apparatus 101 includes a fluid basin 102 configured to receive saline water (see, e.g., saline water SW in FIG. 3A). The fluid basin receives heat energy to form water vapor, such as during the nighttime (see, e.g., water vapor WV in FIGS. 3A, 3B, and 4) from the saline water. The saline water may be received from an ocean, bay, river, lake or other body of water.

A first removable cover 103 is employed to cover the fluid basin 102 to maximize heat retention in the fluid basin (e.g., during daytime hours). The first removable cover 103 allows sunlight and infrared rays to pass through the cover 103 to heat the saline water. A second removable cover 104 is configured to be positioned on the fluid basin 102 (e.g., during nighttime hours) when the first removable cover 103 is removed from the fluid basin 102 to form the water vapor from the saline water.

The second removable cover 104 includes a first plate 105 arranged above the fluid basin 102. The first plate 105 acts as a cold body to convert the water vapor to fresh liquid water. A freshwater collection conduit 106 is arranged below the first plate 105. The freshwater collection conduit 106 collects the fresh liquid water from the first plate 105 and directs the fresh liquid water to a storage tank (e.g., storage tank 120). The storage tank may be an integrally formed structure with the fluid desalinization apparatus 101, or the storage tank may be separated from the fluid desalinization apparatus 101. For example, the storage tank may be a remotely positioned tank, such as a tank stored in the ground, at ground level, or above ground level, and connected with the fluid desalinization apparatus 101 through at least one pipe or a series of pipes.

A second plate 107 is arranged between the freshwater collection conduit 106 and the fluid basin 102. The second plate 107 includes nonlinear apertures 108 configured to pass the water vapor from the fluid basin 102 to the first plate 105.

Figure 4A:
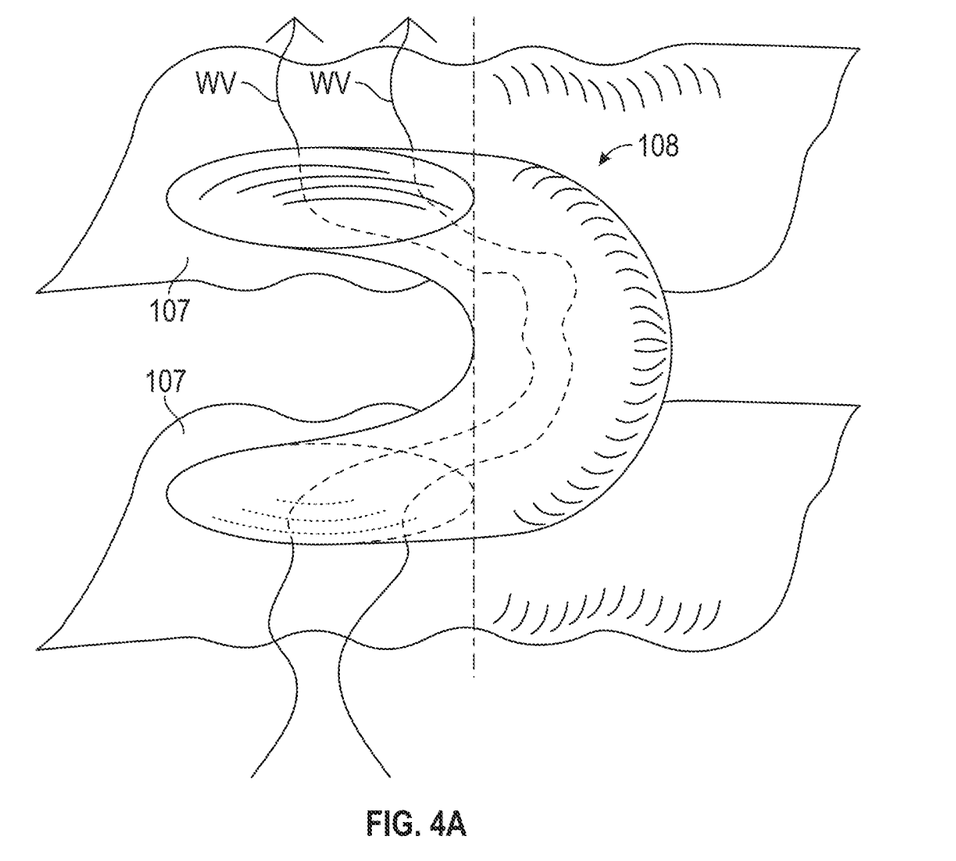
FIG. 4A is a 3-dimensional illustration of a nonlinear aperture of the fluid desalinization apparatus of FIG. 1.
Figure 4B:
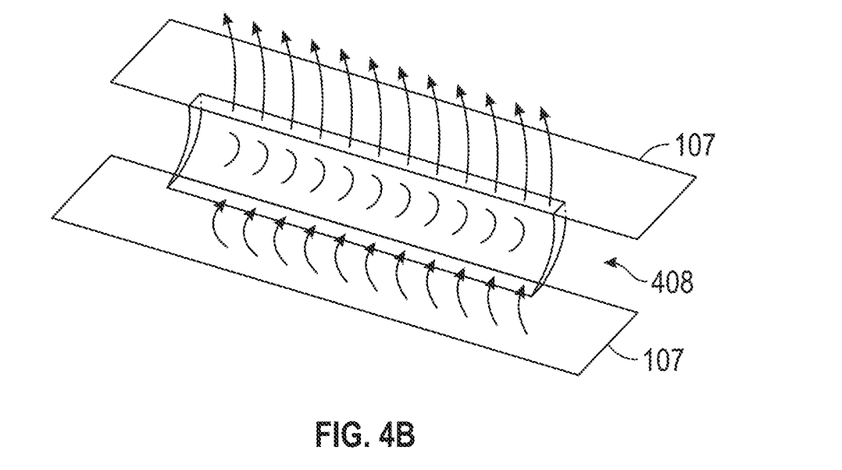
FIG. 4B is a 3-dimensional illustration of a nonlinear slit employable by the fluid desalination apparatus of FIG. 1.

Referring particularly to FIGS. 3A and 4. The nonlinear apertures 108 define a shape lacking a direct line of sight through the nonlinear apertures 108. The nonlinear apertures 108 prevent direct light radiation through the nonlinear apertures 108 because direct light radiation requires a direct line of sight, and thus heat loss as a result of light radiation is reduced or eliminated through use of the nonlinear apertures 108. The nonlinear apertures 108 allow for larger size holes that can increase throughput and efficiency of water vapor passage through the second plate 107 without concerns of radiation losses. That is, the nonlinear apertures 108 allow water vapor to pass, but not light radiation, thus maximizing heat retention.

As an example, the nonlinear apertures 108 may define a curved cylindrical shape or a curved/non-linear slit shape (see, e.g., slit 408 in FIG. 4B) lacking a direct line of sight therethrough. Alternatively, the nonlinear apertures 108 can define other shapes lacking a direct lines of sight therethrough, such as angled holes, zigzag shaped holes, curved round holes, curved square holes, curved diamond shaped holes, curved triangular holes, or curved keyhole shaped holes. The second plate 107 can include or be formed of a material having a low heat transfer coefficient. Exemplary metals having low heat transfer coefficients include steel, stainless steel or bronze. Other exemplary materials having low heat transfer coefficients include plastic (e.g., organic plastics, Polyetherimide (PEI), Polyether ether ketone (PEEK), Polytetrafluoroethylene (PTFE), polybenzimidazole (PBI), or Polydicyclopentadiene (pDCPD)), rubber, or ceramic.

Figure 6A:
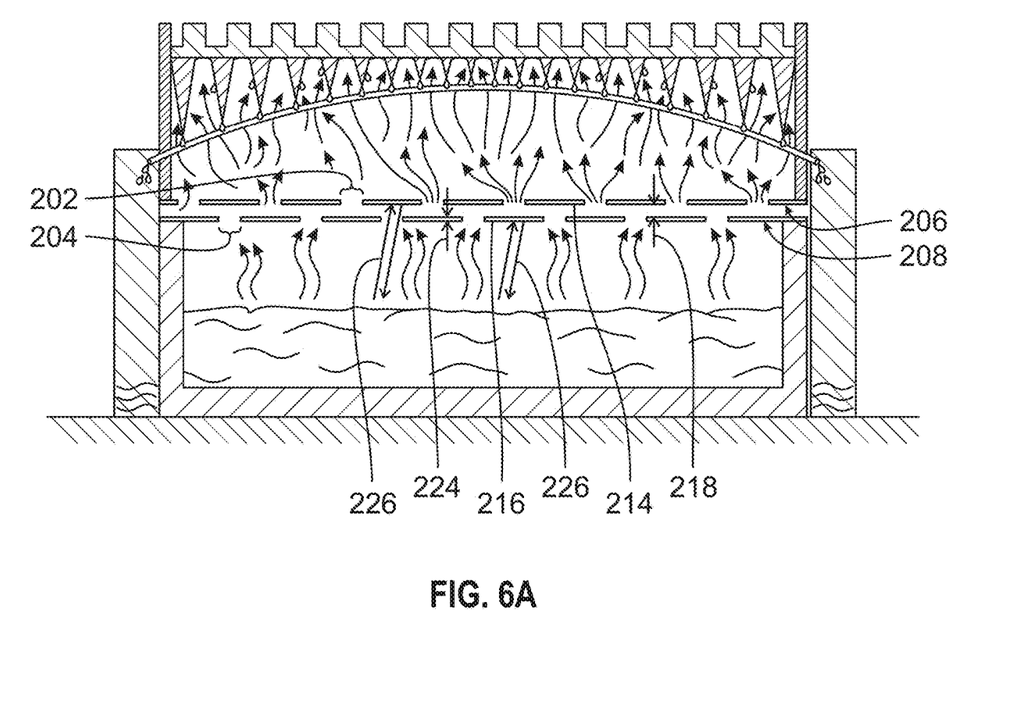
FIG. 6A shows two plates.
Figure 6B:
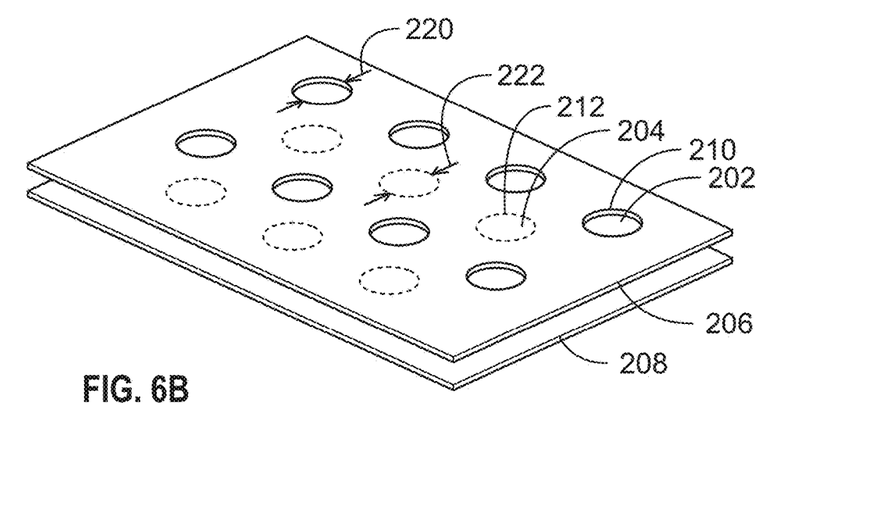
FIG. 6B provides a top view of the plate shown in FIG. 6A.

FIGS. 3A and 4 illustrate nonlinear apertures 108. However, it is also contemplated that the nonlinear apertures 108 may in the alternative be misaligned apertures 202, 204 such as two plates 206, 208, as shown in FIGS. 6A and 6B. The two plates 206, 208 may replace the second plate 107. The two plates 206, 208 may be disposed parallel to each other. The two plates 206, 208 may be gapped away from each other by distance 218. Each of the two plates 206, 208 may have apertures 202, 204. In this way, water vapor can rise and pass through the apertures 202, 204 of the upper and lower plates 206, 208.

These apertures 202, 204 are shown as being circular. They may have a diameter 220, 222. However, it is also contemplated that the apertures 202, 204 may have other shapes such as rectangular, triangular, polygonal, elliptical and combinations thereof.

From a top perspective view as shown in FIG. 6B, an outer periphery 210 of the aperture 202 in the upper plate 206 may be misaligned so that it does not cross over or overlap an outer periphery 212 of the aperture 204 in the lower plate 208. Alternatively, the aperture 202 in the upper plate 206 may overlap between less than 90%, and more preferably less than 10% of the aperture 204 of the lower plate 208. The overlap is in terms of the area of the apertures 202, 204. For example, if an area of the upper aperture 202 is 5 square inches, the area of the lower aperture 204 may overlap less than 90% of 5 square inches, and more preferably, less than 10% of 5 square inches.

The upper and lower plates 206, 208 may be parallel to each other. They 206, 208 may be gapped away by distance 218. It is also contemplated that the upper and lower plates 206, 208 may be skewed with respect to each other.

The lower surfaces 214, 216 of the upper and lower plates 206, 208 may have a mirror like material to reflect back a significant portion of the infrared radiation coming through the apertures 204 of the lower plate 208 from the seawater. The mirror like material may alternatively be a retroreflective surface so that it will reflect most if not all of the infrared radiation from the water, See line 226 in FIG. 6A. As shown in FIG. 6A, the lower plate 208 may have a thickness 224. The size of the aperture 204 such as the diameter 222, the thickness 224, and the size of the aperture 202 and the position of the aperture 202 may be adjusted so that no line of sight exists between the two apertures 202, 204. Referring to line 226 in FIG. 6A, this line 226 represents infrared heat being projected in a straight line away from the heated body of water. Due to the thickness 224 and the diameter 222 of the aperture 204, the line cannot extend through the aperture 202. In this regard, the infrared heat is retained in the container under the plate 208. All surfaces of the upper and lower plates 206, 208 may be insulating hydrophobic material to mitigate water condensation on the upper and lower plates 206, 208.

Referring particularly to FIG. 3A, the first plate 105 includes projections 109 configured to condense the water vapor to form the fresh liquid water. The projections 109 define a tapered tip to drop the fresh liquid water below the first plate 105 toward the freshwater collection conduit 106. As an example, the projections may define a conical or a pyramidal shape. Alternatively, the projections 109 may define a wedge-shaped blade (see, e.g., wedge-shaped blade 309 in FIGS. 3C and 3D) with sloped sides angled toward the freshwater collection conduit 106. The shape of the projections 109 provides an increased surface for condensation and directs condensed fresh liquid water into the freshwater collection conduit 106.

In an aspect of the present disclosure, the projections 109 include at least one hydrophilic material. The hydrophilic material increases the attraction of water vapor for the projections 109 and increases the amount of water vapor that will bond with the projections 109 as the water vapor condenses and forms fresh liquid water. The hydrophilic material regulates the rate of condensation (e.g., by slowing down condensation) so that a flow of fresh liquid water to the freshwater collection conduit 106 can be controlled. As an example, a hydrophilic coating may be formed on the projections 109. The hydrophilic coating may be a hydrogel (e.g., Polyvinyl alcohol (PVA), or Polyethylene glycol (PEG)), a hydrophilic nano-coating, Polyvinylpyrolidone (PVP), Polyurethane, Polyacrylic acid (PAA), or Polyethylene oxide (PEO).

Figure 3B:
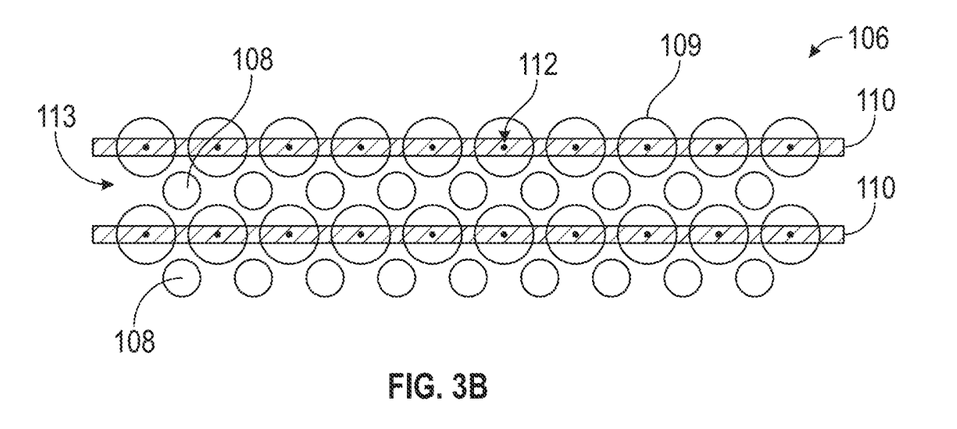
FIG. 3B is a top plan view illustrating an exemplary arrangement of a portion of a freshwater collection system of the fluid desalinization apparatus of FIG. 1.
Figure 3C:
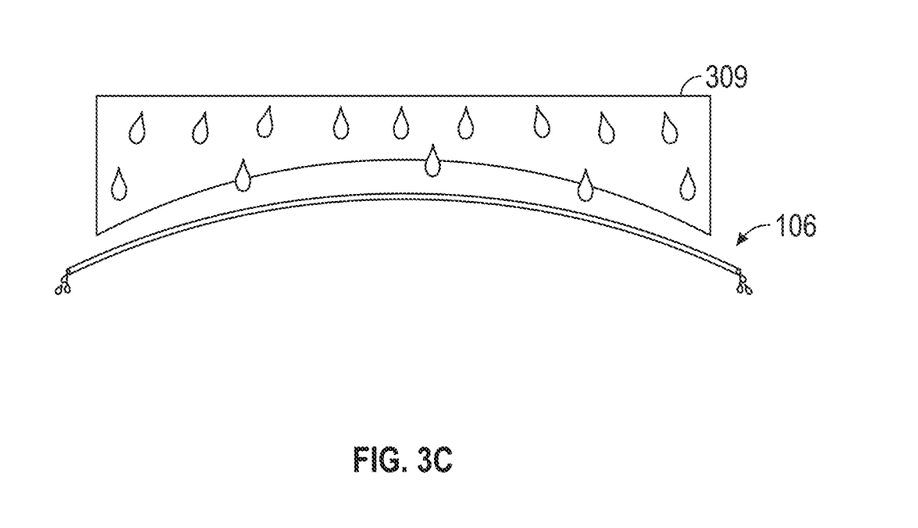
FIG. 3C is a cross-sectional view of a blade-shaped projection employable by the fluid desalinization apparatus of FIG. 1.
Figure 3D:
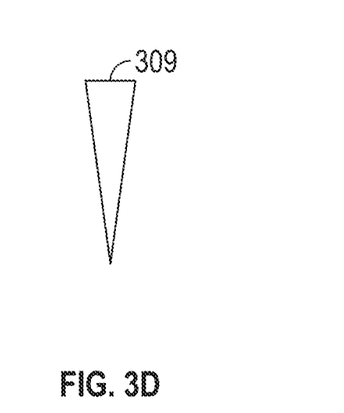
FIG. 3D is a side view of the blade-shaped projection of FIG. 3C.

Referring particularly to FIGS. 3A and 3B, the freshwater collection conduit 106 includes at least one channel 110 arranged below the projections 109 and facing the projections 109. The freshwater collection conduit 106 receives fresh liquid water having condensed on the projections 109 from water vapor and directs the fresh liquid water into a corresponding channel 110 of the freshwater collection conduit 106. The channels 110 may define an open upper portion facing the projections 109 or may include a plurality of apertures aligned with tips 112 of the projections. The shape of the channels 110 of the freshwater collection conduit 106 corresponds with the shape and arrangement of the projections 109. For example, channels 110 having open upper portions are employed with blade-shaped projections 109. The tips 112 of the projections may be arranged in relatively close vertical proximity to (e.g., about 5 mm above) the freshwater collection unit 106 to direct water into channel 110. Thus, a transfer of water droplets from the projections 109 to the freshwater collection unit 106 can be performed without any water loss. The freshwater collection conduit 106 may include many channels 110 vertically aligned with corresponding projections 109 to receive the fresh liquid water dripped from the projections 109. The channels 110 can be horizontally spaced apart from each other with spaces 113 separating the various channels.

As an example, the freshwater collection unit 106 includes at least two channels 110 arranged below the projections 109. The channels 110 define the space 113 between the channels 110 to allow the water vapor (see, e.g., water vapor WV in FIG. 3B) to pass through the space 113 so the water vapor will come into contact with the projections 109 of the first plate 105.

As an example, the freshwater collection conduit 106 may define an arched shape that diverts water toward water storage tanks 120, although any other type of inclined configuration is suitable as well.

In an aspect discussed herein, the projections may be wedge-shaped blades. These wedge shaped blades may be attached to a bottom surface of the night time cover 104 so that the wedge shaped blades extend downward. A thicker end of the wedge shaped blades may be attached to the bottom surface and a narrower end of the wedge shaped blades may be disposed below the thicker end. A distal end or tip of the wedge shaped blade may be contoured and be disposed directly above the channel 110. That way, water that condenses on the wedge shaped blades would slide off of the blades and fall into the channel 110 which may have an open upper portion. A plurality of these blades and channels may be disposed in parallel with each other and be used throughout a length and/or width of the night time cover 104.

In an aspect of the present disclosure, the water collection conduit 106 includes at least one hydrophobic material vertically aligned with the hydrophilic material of the projections 109. The hydrophobic material prevents water vapor from condensing on the water collection conduit 106 so that the water vapor can be selectively directed to the projections 109 to control a flow of condensed liquid water along the shape of the projections and into the water collection conduit 106 without any water loss. As an example, a hydrophobic coating may be formed on the water collection conduit 106. The hydrophobic coating may include manganese oxide polystyrene (MnO2/PS), zinc oxide polystyrene (ZnO/PS), precipitated calcium carbonate, carbon nanotubes, silica, fluorinated saline, or a fluoropolymer (e.g., Polytetrafluoroethylene (PTFE)).

In use, condensed water (i.e., fresh liquid water) trickles down the projections 109 to the freshwater collection conduit 106. The projections 109, which may include the hydrophilic material, allows the water vapor to condense into fresh liquid water and advance down toward the tips 112 of the projections and into the freshwater collection conduit 106. Generally, hydrophilic surfaces tend to retain the water and slow down condensation. However, the shape of the projections 109 facilitate trickling down of the condensed water droplets through gravity. Trickled down droplets fall into the channel 110 of the freshwater collection conduit 106. The hydrophobic material of the freshwater collection conduit 106 guides the fresh liquid water into the channel 110 through gravity force. The shape of the projections 109 has the benefit of greatly increasing the available surface area for condensation in a relatively small structure and helps much in releasing the droplets down from the pointed tips 112 of the projections 109.

In an aspect of the present disclosure, at least one projection 109 is configured to be vibrated or mechanically agitated to remove water from the projection 109. This increases a rate of water droplets being dropped into the freshwater collection conduit 106 beyond the rate facilitated by gravity alone, and therefore increases a rate of freshwater collection.

Easy and frequent trickling down of droplets is an important factor for efficient condensation as it allows new droplets to form faster rather than previous ones, unnecessarily, cooled down further.

For this purpose, and to enhance trickling, a mechanical shaking device may be employed to generate vibration or mechanical agitation of the projections 109 by which periodically an impact is applied to the first plate 105 to persuade droplets (developed on the projections 109) to trickle down faster. The mechanical shaking device may include a mechanical pendulum powered by a wind turbine that releases the pendulum to impact the first plate 105 periodically.

The connection between the freshwater collection conduit 106 and the storage tank 120 may be airtight to prevent any loss of freshwater. One or more pipes may connect the freshwater collection conduit 106 with the storage tank 120 through at least one airtight connection.

In an aspect of the present disclosure and referring particularly to FIG. 3A, fins 117 are defined on the first plate 105. The fins 117 are configured to cool the first plate 105. The first plate 105 act as a good heat conductor as well as a good heat radiator into the sky and surrounding area, and the fins 117 increases cooling of the first plate 105 as a result of increased surface area and as a result of nighttime breezes passing over the fins 117. As an example, the fins 117 may be formed on an upper surface of the first plate 105, opposite the second plate 107. As an example, the fins 117 may define a series of peaks and valleys having substantially vertical sidewalls and substantially flat upper and lower surfaces. Alternatively, the fins 117 may defines semi-spherical studs to increase the upper surface area of the first plate 105 to allow better cooling by the nighttime breezes in addition to radiation cooling.

In use, one practice to avoid water vapor loss into open air during exchanging the first cover 103 with the second cover 104, is to put the first cover 103 alongside the second cover 104 and slide both together over the fluid basin 102 until the first cover 103 is fully disengaged from the fluid basin 102. This prevents any exposure of the fluid basin 102 to open air and prevents water vapor escape. Another practice is to put the second cover 104 on top of first cover 103 first before sliding off the first cover 103 from under the second cover 104. These practices make sure that the developed water vapor during day will not be lost into the open air when exchanging the covers 103 and 104.

After most of the saline water in the fluid basin 102 is evaporated and converted into fresh water, the covers 103 and 104 can be removed, and the remaining salt slush or residues can be collected or scraped off of the fluid basin 102 and taken away. This residue could be either processed to recover valuable minerals such as gold and lithium or disposed of (e.g., somewhere in the desert) with no pollution danger as the desert is already full of the same minerals. One very important advantage of the system and apparatus described herein is that nearby sea water salinity would not be increased. Conventional seaside installations (either thermal or reverse osmosis) dump the residue's high salinity water back into the sea, thus raising its salt concentration in the neighboring area, making further desalinization more difficult. High salinity endangers natural sea life very much, especially that when returned brine settles more towards the seabed destroying natural life there.

Figure 5A:
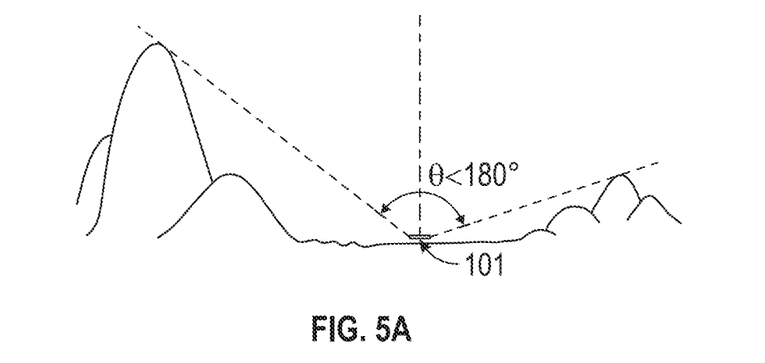
FIG. 5A illustrates the water desalinization apparatus of FIG. 1 in a first directional orientation.
Figure 5B:
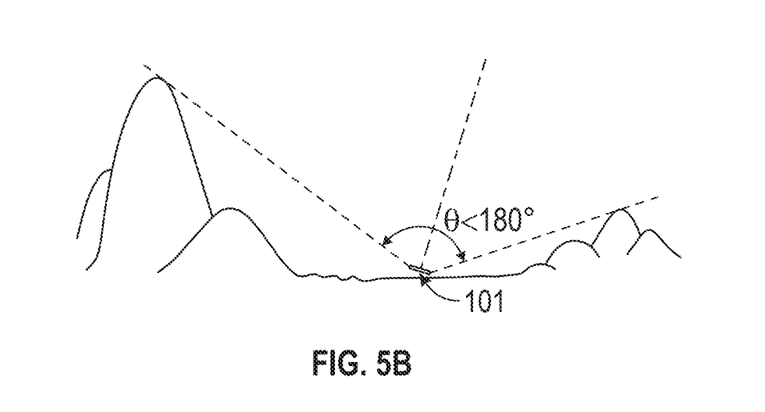
FIG. 5B illustrates the water desalinization apparatus of FIG. 1 in a second directional orientation.

Referring to FIGS. 5A and 5B, site selection for the desalinization plant including the desalinization apparatus 101 can be somewhere that is elevated with no high mountains or hills overlooking it. This prevents any obstructions between the upper plate 105 and the sun, thus avoiding any reduction in the heat generated ability of the desalinization apparatus 101. Obstructions, such as mountains or other terrain can also reduce radiation into the sky and exposes the desalinization apparatus 101 to undesirable high temperature ground radiation. An inclination can be introduced to the desalinization apparatus 101, or at least to the first plate 105, to achieve a widest view. The first plate 105 may also be inclined or angled to be optimized to the sky during the night time for best heat radiation into the sky. Regardless of the inclination or angular orientation of the first plate 105, the orientation, positioning and alignment of the projections 109 to the channel 110 may be retained as described herein.

Figure 5C:
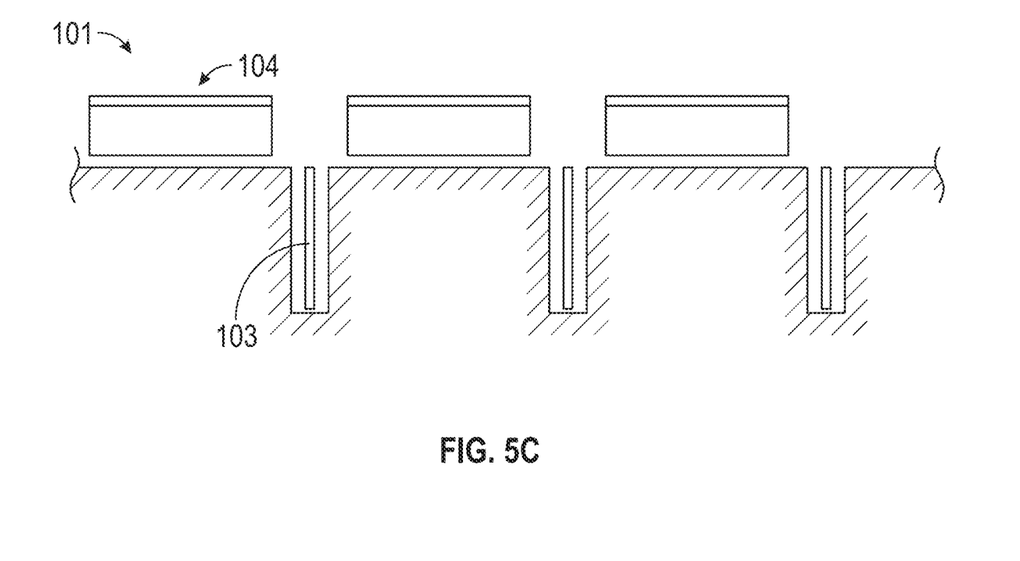
FIG. 5C illustrates an array of water desalinization apparatuses of FIG. 1 with a storage compartment for either the daytime cover or the nighttime cover.

Referring to FIG. 5C, an array of desalinization apparatuses 101 can be constructed or arranged side by side. Either of covers 103, 104 can be stored alternately on the desalinization apparatus 101 to save space and keep them secured. Storing either of the covers in a subterranean storage ditch or channel may also help control an initial temperature of the covers 103 or 104. For example, it may be preferable to have a nighttime cover 104 that is relatively cool when arranged on the fluid basin 102.

The covers 103, 104 can be exchanged by automatic equipment, as desired.

While the system and apparatus described herein may be employed for desalinization of saline water by removing fresh liquid water from salt contained in the saline water, the system and apparatus described herein may similarly be employed for separating fresh water from other minerals other than salt.

In use, the desalinization apparatus 101 should be arranged in a location having a sufficient temperature difference (e.g., at daytime vs. nighttime) to create an air temperature surrounding the saline water that is sufficient to raise the saline water temperature above the heat of particular heat of vaporization of the saline water (e.g., in the desert having a daytime temperature that is at least 20 degree hotter than a nighttime temperature). The heat of vaporization of water is gradually lowered as the saline or salt concentration increases, and thus the heat of vaporization of the saline water will vary along with the concentration of salt in the saline water.

The first plate 105 acting as a cold body to convert the water vapor to fresh liquid water should be reduced to a temperature sufficiently low enough to reduce the temperature of water vapor below the heat of vaporization. However, the heat of vaporization will vary based on altitude and/or pressure and thus the temperature differences needed to operate the desalinization apparatus 101 will vary based on location.

What is claimed is:

1. A fluid desalinization apparatus, comprising:
   a fluid basin configured to receive saline water, the fluid basin configured to receive heat energy to form water vapor from the saline water;
   a first plate arranged above the fluid basin, the first plate configured to act as a cold body to convert the water vapor to fresh liquid water;
   a storage tank:
   a freshwater collection conduit arranged below the first plate, the freshwater collection conduit configured to collect the fresh liquid water from the first plate and direct the fresh liquid water to the storage tank; and
   upper and lower plates arranged between the freshwater collection conduit and the fluid basin, wherein the upper and lower plates include a plurality of upper and lower apertures configured to pass the water vapor from the fluid basin to the first plate, wherein the upper apertures of the upper plate are offset from all of the other lower apertures of the lower plate to minimize a direct line of sight through the upper and lower aperture of the upper and lower plates.

2. The fluid desalinization apparatus of claim 1 wherein the upper apertures of the upper plate is completely offset from the lower apertures of the lower plate to completely eliminate a direct vertical line of sight through the upper and lower apertures of the upper and lower plates.

3. The fluid desalinization apparatus of claim 1, wherein an area of the upper apertures of the upper plate overlaps less than 10% of an area of the lower aperture of the lower plate.

4. A fluid desalinization apparatus comprising:
   a fluid basin configured to receive saline water, the fluid basin configured to receive heat energy to form water vapor from the saline water;
   a first plate arranged above the fluid basin, the first plate configured to act as a cold body to convert the water vapor to fresh liquid water;
   a storage tank;
   a freshwater collection conduit arranged below the first plate, the freshwater collection conduit configured to collect the fresh liquid water from the first plate and direct the fresh liquid water to the storage tank; and
   upper and lower plates arranged between the freshwater collection conduit and the fluid basin, wherein the upper and lower plates include a plurality of upper and lower apertures configured to pass the water vapor from the fluid basin to the first plate, wherein the upper apertures of the upper plate are offset from the lower apertures of the lower plate to minimize a direct line of sight through the upper and lower aperture of the upper and lower plates:
   wherein lower surfaces of the upper and lower plates have a retroreflective attribute.

5. The fluid desalinization apparatus of claim 1 wherein exterior surfaces of the upper and lower plates have an insulating hydrophobic material to mitigate condensation on the upper and lower plates.

6. The fluid desalinization apparatus of claim 1, wherein the first plate includes a plurality of projections configured to condense the water vapor to form the fresh liquid water, and wherein projections of the plurality of projections define a tapered tip configured to drop the fresh liquid water below the first plate toward the freshwater collection conduit.

7. The fluid desalinization apparatus of claim 6, wherein the projections of the plurality of projections define a conical or pyramidal shape.

8. The fluid desalinization apparatus of claim 6, wherein the freshwater collection conduit includes at least one channel arranged below the plurality of projections, wherein all of the at least one channel is vertically aligned with a tip of a corresponding projection of the plurality of projections.

9. The fluid desalinization apparatus of claim 6, wherein at least one projection of the plurality of projections is configured to be vibrated, mechanically agitated, or cyclically impacted with an impactor to remove water therefrom.

10. The fluid desalinization apparatus of claim 6, wherein at least one projection of the plurality of projections includes at least one hydrophilic material.

11. The fluid desalinization apparatus of claim 10, wherein the water collection conduit includes at least one hydrophobic material vertically aligned with the at least one hydrophilic material of the at least one projection of the plurality of projections.

12. The fluid desalinization apparatus of claim 6, wherein the freshwater collection conduit includes at least two channels arranged below the plurality of projections, and wherein the at least two channels define a space therebetween to allow the water vapor to pass therethrough.

13. The fluid desalinization apparatus of claim 1, further including at least one sidewall forming an airtight seal between the first plate and a second plate.

14. The fluid desalinization apparatus of claim 1, wherein the fluid basin defines at least one sidewall and a floor, at least one of the at least one sidewall or the floor including a dark sunlight absorbing material configured to heat the saline water.

15. The fluid desalinization apparatus of claim 1, further including a substantially transparent cover, the substantially transparent cover configured to allow sunlight and infrared rays to pass therethrough to heat the saline water, wherein the first plate and a second plate are removable from the fluid basin, and wherein the substantially transparent cover is configured to removably cover the fluid basin when the first plate and the second plate are removed from the fluid basin.

16. The fluid desalinization apparatus of claim 1, wherein the first plate and a second plate are parts of a single integrally formed structure.

17. The fluid desalinization apparatus of claim 16, wherein the single integrally formed structure is removable from the fluid basin.

18. The fluid desalinization apparatus of claim 1, wherein an angle of the first plate to a horizontal plane is set to increase heat radiation to cool the first plate.

19. The fluid desalinization apparatus of claim 1, further including at least one freshwater collection tank in fluid communication with the freshwater collection conduit.

20. The fluid desalinization apparatus of claim 1, wherein the apertures are nonlinear and define a curved cylindrical shape.

21. A fluid desalinization apparatus, comprising:
   a fluid basin configured to receive saline water, the fluid basin configured to receive heat energy to form water vapor from the saline water;
   a first plate arranged above the fluid basin, the first plate configured to act as a cold body to convert the water vapor to fresh liquid water;

a storage tank:

a freshwater collection conduit arranged below the first plate, the freshwater collection conduit configured to collect the fresh liquid water from the first plate and direct the fresh liquid water to the storage tank;

a plurality of projections extending from the first plate, the projections of the plurality of projections configured to condense the water vapor to form the fresh liquid water, and wherein the projections of the plurality of projections define a tapered tip configured to drop the fresh liquid water below the first plate toward the freshwater collection conduit; and upper and lower plates arranged between the freshwater collection conduit and the fluid basin, wherein the upper and lower plates are configured to act as a heat insulating body to prevent the received heat energy from exiting the fluid basin.

22. The fluid desalinization apparatus of claim 21, wherein the projections of the plurality of projections define a conical, pyramidal shape, or wedge shaped with one sharp edge or two opposed sharp edges.

23. The fluid desalinization apparatus of claim 21, wherein the freshwater collection conduit includes at least one channel arranged below the plurality of projections, wherein all of the at least one channel is vertically aligned with a tip of a corresponding projection of the plurality of projections.

24. A fluid desalinization apparatus, comprising:

a fluid basin configured to receive saline water, the fluid basin configured to receive heat energy to form water vapor from the saline water;

a storage tank:

a first removable cover configured to cover the fluid basin to maximize heat retention in the fluid basin, the first removable cover configured to allow sunlight and infrared rays to pass therethrough to heat the saline water; and a second removable cover configured to be positioned on the fluid basin when the first removable cover is removed from the fluid basin to form the water vapor from the saline water, the second removable cover including:

a first plate arranged above the fluid basin, the first plate configured to act as a cold body to convert the water vapor to fresh liquid water;

a freshwater collection conduit arranged below the first plate, the freshwater collection conduit configured to collect the fresh liquid water from the first plate and direct the fresh liquid water to the storage tank; and upper and lower plates arranged between the freshwater collection conduit and the fluid basin, wherein the upper and lower plates include a plurality of apertures offset from each other so that water vapor is allowed to pass from the fluid basin to the first plate and mitigate infrared radiation from passing through the apertures.

* * * * *